United States Patent [19]

Kavanagh

[11] Patent Number: 4,804,880

[45] Date of Patent: Feb. 14, 1989

[54] MOUNTING FOR SHADOW MASK IN COLOR CATHODE RAY TUBES

[75] Inventor: Martin Kavanagh, Wallington, United Kingdom

[73] Assignee: Rank Brimar Limited, United Kingdom

[21] Appl. No.: 38,233

[22] Filed: Apr. 14, 1987

[30] Foreign Application Priority Data

Apr. 15, 1986 [GB] United Kingdom ............... 8609139

[51] Int. Cl.4 ............................................ H01J 29/07
[52] U.S. Cl. .................................... 313/404; 313/406; 313/407
[58] Field of Search ................. 313/402, 404, 406, 407

[56] References Cited

U.S. PATENT DOCUMENTS 3,529,199  9/1970  Duistermaat et al. ............. 313/404

Primary Examiner—Leo H. Boudreau
Assistant Examiner—K. Wieder
Attorney, Agent, or Firm—Lerner, David, Littenberg, Krumholz & Mentlik

[57] ABSTRACT

A plurality of mountings for locating a shadow mask carrying frame in a color cathode ray tube each comprise one mounting element bonded to the tube wall and another mounting element connected to the frame, which together provide a spring-loaded spigot-and-socket connection. One feature is that the element has a portion bonded to the wall of a compatible material and a second portion of a hard material for low-wear. Another feature is that the element which provides the spigot has a recess therearound within the thickness of the wall into which the other element extends in order to save space.

16 Claims, 3 Drawing Sheets 4,804,880

MOUNTING FOR SHADOW MASK IN COLOR CATHODE RAY TUBES

FIELD OF THE INVENTION

This invention is concerned with colour cathode ray tubes.

In particular, one aspect of this invention relates to colour cathode ray tubes of the type having a shadow mask carrying frame and a plurality of means arranged around the frame to mount the frame in the tube, each mounting means comprising a mounting element which is bonded to a wall of the tube and a mounting element connected to the frame, and the two mounting elements together providing a spring-loaded complementary spigot-and-socket connection.

A second aspect of the present invention relates to a cathode ray tube of the type having a shadow mask carrying frame and a plurality of means arranged around the frame to mount the frame in the tube, each mounting means comprising a mounting element providing a spigot and secured to a wall of the tube and a mounting element providing a socket and connected to the frame so that the two mounting elements together provide a spring-loaded complementary spigot-and-socket connection.

BACKGROUND ART

An arrangement according to the first aspect of the invention is known. In the known arrangement, the mounting element which is bonded to the tube wall is made of a soft nickel-iron alloy, so as to have a similar coefficient to expansion to that of the tube. The material of the mounting element connected to the frame matches that of the mounting element bonded to the tube wall, with the intention of alleviating undesirable wear of the spigot. However, a disadvantage arises in that, since the mounting elements are both relatively soft, wear is still a problem and the arrangement is not very rigid.

An arrangement to the second aspect of the invention is also known, in which the spigot projects from the tube wall in order to be able to engage with the socket.

SUMMARY OF THE INVENTION

In accordance with the first aspect of the invention, the mounting element which is bonded to the tube wall comprises a first portion bonded to the wall of a material compatible with the material of the tube and a second portion providing the spigot or socket (as the case may be) which is secured to the first portion and which is of a hard material.

In one arrangement, the spigot can be provided on the mounting element which is bonded to the tube, and the socket can be provided by the mounting element which is connected to the frame. In this case, a recess is preferably provided around the spigot within the thickness of the tube wall, the other mounting element extending into the recess. In an alternative arrangement, the spigot may be provided by the mounting element which is connected to the frame, and the socket can be provided by the mounting element which is bonded to the tube. In this case, the socket is preferably recessed within the thickness of the tube wall. By providing such recessing, the amount of space taken up by the mounting means is reduced.

The first portion of the mounting element which is bonded to the tube wall preferably has a coefficient of expansion of the same order as that of the tube wall in order to provide the required compatibility with the tube.

In accordance with the second aspect of the invention, a recess is provided around the spigot within the thickness of the tube wall, and the other mounting element extends into the recess. Such recessing around the spigot and entry of the socket forming element into the recess reduces the amount of space taken up by the mounting means.

In one arrangement, the spigoted mounting element is provided by a single member having a coefficient of expansion of the same order as that of the tube, in order to be compatible with the tube. However, in a preferred arrangement, the spigoted mounting element comprises a first member bonded to the tube and having a coefficient expansion of the same order as that of the tube and a second member joined to the first member and providing the spigot. In this case, the second member may be formed of a material which is harder than that of the first member. When used with a socket forming member also of a hard material, problems of wear are alleviated.

With either aspect of the invention, each mounting element may be connected to the frame by a leaf spring having one end secured to the frame. Furthermore, each spigot is preferably tapered so as to be positively located by engagement with the mouth of the socket.

DESCRIPTION OF THE EMBODIMENTS

Figure 1:
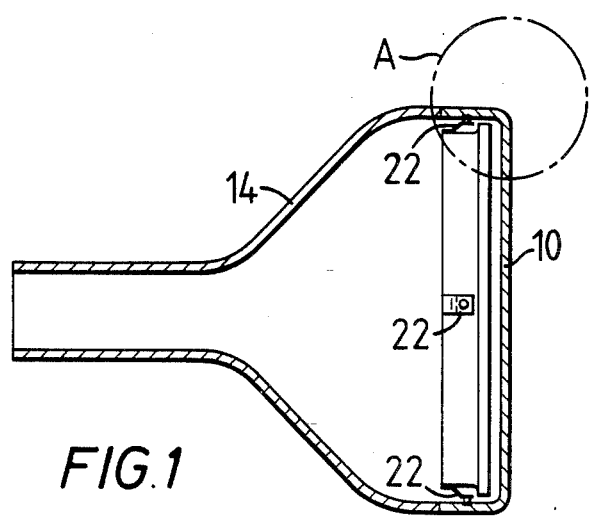
FIG. 1 is a schematic side view of a CRT with the envelope and faceplate sectioned.
Figure 2:
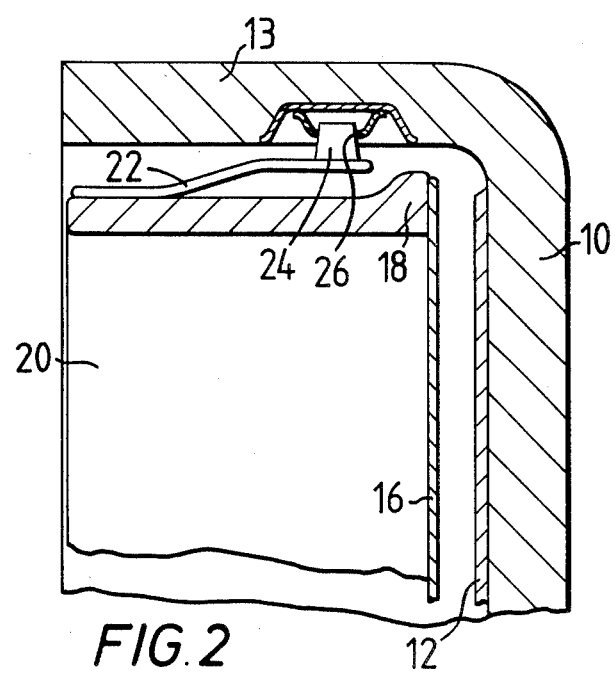
FIG. 2 is an enlarged schematic view showing detail of the portion marked "A" in FIG. 1.

Referring to FIGS. 1 and 2 of the drawings, a CRT has a faceplate 10 internally lined with a phosphor pattern 12 and the faceplate 10 has a flange 13 which is bonded to the envelope 14 of the tube. A shadow mask 16 is welded to front edge 18 of a generally rectangular frame 20 within the tube adjacent the faceplate 10, and the frame 20 is mounted at four locations spaced around the frame to the flange 13 of the tube faceplate 10. At each such location, one of which is shown in FIG. 2, a leaf spring 22 which is welded to the frame 20 extends alongside the faceplate flange 13, and a tapered spigot 24 welded to the free end of the leaf spring 22 projects radially outwardly into a socket 26 provided in the inner surface of the flange 13.

At each of the four mounting locations, the leaf spring 22 and the engagement of its spigot 24 with the respective socket 26 prevents movement of the frame 20 (i) longitudinally of the leaf spring (that is, towards and away from the faceplate 10) and (ii) laterally of the leaf spring (that is, into and out of the paper as seen in FIG.

2). The lateral constraints provided by all four leaf springs 22 therefore prevent the frame 20 moving in its own plane.

Figure 3A:
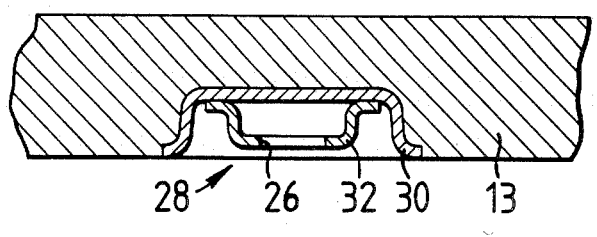
FIGS. 3A and 3B are detail views of two versions of socket-type mounting element on the tube.

Reference is now made to FIG. 3A, which shows detail of the socket 26 shown in FIG. 2.

A mounting element 28 which provides the socket 26 includes a dished element 30 which is bonded in a recess in the faceplate flange 13 so that it is flush with, slightly recessed below, or slightly raised above, the inner surface of the flange. The dished element 30 is formed of a material which matches that of the flange 13 in that it has a similar coefficient of expansion, whereby the dished element, flange and bond therebetween do not become substantially stressed upon charges of temperature. In the case where the faceplate is made of glass, the dished element 30 may be formed of an alloy known as "Nilo 475". If however, the faceplate is of a ceramic material, the dished element may be formed of an alloy known as "Vacon 70". Both of these alloys are relatively soft.

In order to provide for a harder spigot-engaging portion of the socket 26, the socket 26 is formed in the base of a further dished element 32 which is disposed in and upside-down relative to the soft dished element 30. The rim of the further element 32 is welded to the base of the element 30 and the base of the further element 32 is flush with, or recessed slightly below, or raised slightly above the inner surface of the flange 13. The further dished element 32 is made of a hard material such as stainless steel hardened by heat treatment.

Figure 4A:
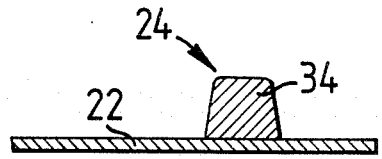
FIG. 4A, 4B and 4C are detailed views of three versions of spigot-type mounting element connected to the frame for engagement with either of the sockettype elements shown in FIGS. 3A and 3B.

Referring now to FIG. 4A, detail is shown of the spigot in FIG. 2. The spigot 24 is simply provided by a frusto-conical lump 34 of hard material attached at its larger end to the free end of the leaf spring 22.

Upon mating of the spigot 24 and socket 26, the spigot fully engages the socket partway along the length of the spigot due to the conical form of the spigot and the relative sizes of the spigot and socket.

Figure 3B:
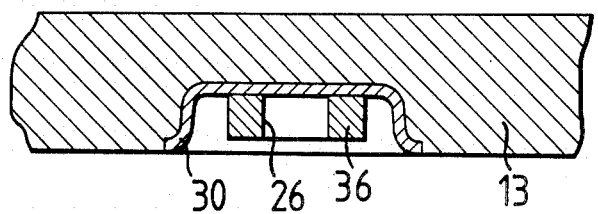

FIG. 3B shows an alternative to the arrangement of FIG. 3A, in which the hard element providing the socket 26 is an annular element 36 and is attached to the base of the soft dished element 30.

Figure 4B:
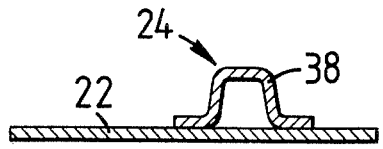
Figure 4C:
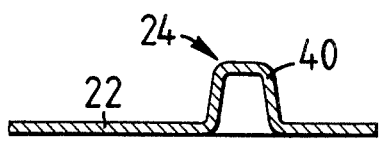

FIGS. 4B and 4C show alternatives to the spigot arrangement. In FIG. 4B, the spigot 24 is provided by a generally frusto-conical dished element 38 welded at its rim to the leaf spring 22, whereas in FIG. 4C the spigot 24 is formed integrally with the leaf spring 22 to provide a generally frusto-conical projection 40.

Figure 5A:
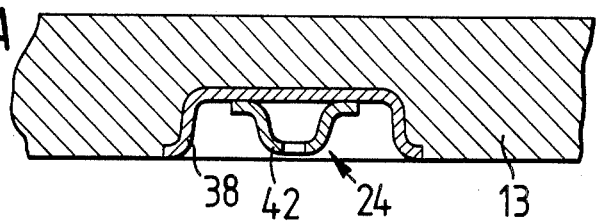
FIGS. 5A, 5B and 5C are detail views of three versions spigot-type mounting element on the tube.
Figure 5B:
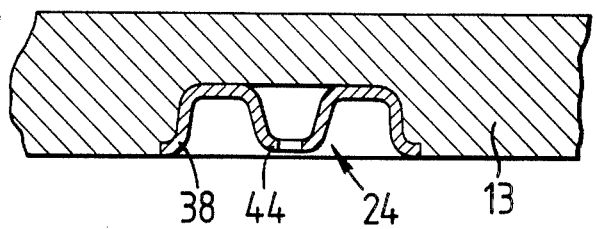
Figure 5C:
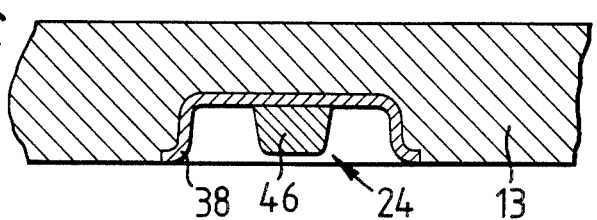
Figure 6A:
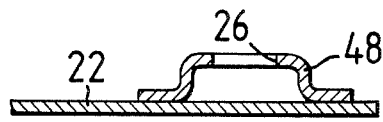
FIGS. 6A, 6B and 6C are detail views of three versions of socket-type mounting element connected to the frame for engagement with any of the spigot-type elements shown in FIGS. 5A, 5B and 5C.
Figure 6B:
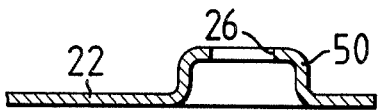
Figure 6C:
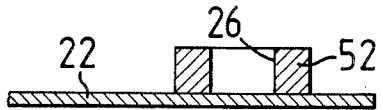

Reference is now made to FIGS. 5A, 5B and 5C which show modifications in which the spigot 24 is provided by a mounting element on the faceplate flange 13 and FIGS. 6A, 6B and 6C which show complementary socket-forming mounting elements provided on the leaf spring 22.

In FIG. 5A, the spigot 24 is provided by a dished element 42, similar to the element 38 in FIG. 4B, welded to the soft alloy dished element 38. The spigot 24 of FIG. 5B is formed by an integral portion 44 of the soft alloy dished element 38, in a somewhat similar fashion to the spigot 40 in FIG. 4C. In FIG. 5C, the spigot 24 is provided by a frustoconical lump 46 attached to the soft alloy dished element 38, similar to the spigot 34 of FIG. 4A. In each of FIGS. 5A, 5B and 5C, the top of the spigot may be level with, raised above or recessed below the surface of the flange 13.

To complement the spigots shown in FIGS. 5A, 5B and 5C, a socket 26 may be provided on the leaf spring 22 in (a) a dished element 48, for example of stainless steel, as shown in FIG. 6A and similar to the element 32 of FIG. 3A; (b) an integral portion 50 of the leaf spring 22, as shown in FIG. 6B, or (c) an annular element 52, similar to the element 36 in FIG. 3B, attached to the spring 22, as shown in FIG. 6C.

In all of the arrangements described above, the portion of the mounting element which forms the socket 26 is formed of a hard material, such as heat treated stainless steel. Preferably, the spigot 24 is also of hard material, and this can be achieved in all of the spigot-providing arrangements illustrated except that of FIG. 5B, where the spigot is of the same material as that which is bonded to the faceplate flange 13. However, if the spigot is of a relatively soft material, upon wear of the spigot there is a tendency for the spigot to barrel or bulge and thus there is no substantial detrimental effect to the positiveness and stability of the location of the spigot and socket.

The cross-section of the spigot and shape of the socket is preferably circular, but they may be a different shape, such as elliptical, square, rectangular or triangular. Furthermore, more than one spigot and socket arrangement may be formed at each mounting element. For convenience the socket is cylindrical, but it may alternatively be shaped and/or tapered complementarily to the spigot.

It will be noted that the space occupied by the mounting arrangements described above is small. The mounting element on the tube is recessed into the wall of the tube to save space, and the clearance between the frame 20 and tube in the region of the leaf spring 22 need only be sufficient to enable the spigot and socket to be disengaged.

What I claim is:

1. A colour cathode ray tube comprising a tube wall, a shadow mask carrying frame and a plurality of mounting means arranged around the frame to mount the frame within the tube wall, each mounting means comprising a spigoted mounting element which is bonded to the tube wall and defines a spigot, and a socketed mounting element connected to the frame and defining a socket, and the two mounting elements together providing a spring-loaded complementary spigot-and-socket connection, the spigoted mounting element comprising a first member bonded to the tube wall of a material compatible with the material of the tube and a second member providing said spigot which is secured to the first member and which is of a material harder than the material of said first member.

2. A cathode ray tube as claimed in claim 1, wherein the tube wall has a thickness and a recess is provided around the spigot within the thickness of the tube wall and the socketed mounting element extends into the recess.

3. A cathode ray tube as claimed in claim 1, wherein the first member of the mounting element which is bonded to the tube wall has a coefficient of expansion of the same order as that of the tube wall.

4. A cathode ray tube as claimed in claim 1, wherein the socketed element includes a leaf spring having one end secured to the frame.

5. A colour cathode ray tube as claimed in claim 1 wherein the spigot is tapered.

6. A colour cathode ray tube comprising a tube wall, a shadow mask carrying frame and a plurality of mounting means arranged around the frame to mount the frame within the tube wall, each mounting means comprising a spigoted mounting element providing a spigot and secured to the tube wall and a socketed mounting element providing a socket and connected to the frame so that the two mounting elements together provide a spring-loaded complementary spigot-and-socket connection the tube wall having a thickness and, a recess being provided around the spigot within the thickness of the tube wall and the socketed mounting element extending into the recess.

7. A cathode ray tube as claimed in claim 6, wherein the spigoted mounting element is provided by a single member having a coefficient of expansion of the same order as that of the tube.

8. A cathode ray tube as claimed in claim 6 wherein the spigoted mounting element comprises a first member bonded to the tube wall and having a coefficient of expansion of the same order as that of the tube and a second member joined to the first member and providing the spigot.

9. A cathode ray tube as claimed in claim 8, wherein the second member is of a harder material than the first member.

10. A cathode ray tube as claimed in claim 6, wherein the socketed mounting element includes a leaf spring having one end secured to the frame.

11. A colour cathode ray tube as claimed in claim 6, wherein the spigot is tapered.

12. A colour cathode ray tube comprising a tube wall, a shadow mask carrying frame and a plurality of mounting means arranged around the frame to mount the frame within the tube wall, each mounting means comprising a socketed mounting element boded to the tube wall and defining a socket, and a spigoted mounting element connected to the frame and defining a spigot, and the two mounting elements together providing a spring-loaded complementary spigot-and-socket connection, the socketed mounting element comprising a first member bonded to the tube wall of a material compatible with the material of the tube and a second member providing the socket which is secured to the first member and which is of a material harder than the material of said first member.

13. A cathode ray tube as claimed in claim 12, wherein the first member of the socketed mounting element has a coefficient of expansion of the same order as that of the tube wall.

14. A cathode ray tube as claimed in claim 12, wherein the spigoted mounting element includes a leaf-spring having one end secured to the frame.

15. A cathode ray tube as claimed in claim 12, wherein the spigot is tapered.

16. A cathode ray tube as claimed in claim 12, wherein the tube wall has a thickness and the socket is recessed within the thickness of the tube wall.

* * * * *

UNITED STATES PATENT AND TRADEMARK OFFICE
CERTIFICATE OF CORRECTION

PATENT NO. : 4,804,880

DATED : February 14, 1989

INVENTOR(S) : Martin Kavanaugh

It is certified that error appears in the above-identified patent and that said Letters Patent is hereby corrected as shown below:

Column 3, line 14, "charges" should read --changes--.
Column 4, line 60, following "socketed" insert --mounting--.
Column 6, line 5, "boded" should read --bonded--.

Signed and Sealed this

Twenty-ninth Day of August, 1989

*Attest:*

DONALD J. QUIGG

*Attesting Officer*　　　*Commissioner of Patents and Trademarks*